United States Patent Office 3,584,037
Patented June 8, 1971

3,584,037
1-CARBOXY-3-METHYLENE-1,2,2,4,5-PENTACHLOROPENT-4-ENE
Jerome A. Gourse, Chicago, Ill., assignor to Velsicol Chemical Corporation, Chicago, Ill.
No Drawing. Filed May 21, 1969, Ser. No. 826,703
Int. Cl. C07c 61/20
U.S. Cl. 260—514                                     1 Claim

ABSTRACT OF THE DISCLOSURE

This invention discloses the new compound 1-carboxy-3-methylene 1,2,2,4,5-pentachloropent-4-ene and its uses as a herbicide.

---

This invention relates to the new compound 1-carboxy-3-methylene-1,2,2,4,5-pentachloropent-4-ene having the structural formula

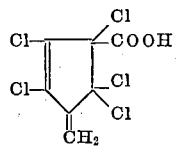

This compound is useful as a herbicide.

The preparation of the new compound of this invention is illustrated in the following example.

EXAMPLE 1

Preparation of 1-carboxy-3-methylene-1,2,2,4,5-pentachloropent-4-ene

2 - keto - 1,4,5,6,7,7-hexachlorobicyclo[2.2.-]hept-5-ene (0.87 gram) was placed in a glass beaker containing water (50. ml.). Aqueous sodium hydroxide (55.1 ml.; 0.1 N) was slowly added to the beaker with stirring over a period of about 5 hours. After this time the aqueous mixture was extracted with ether. The remaining aqueous phase was acidified with concentrated hydrochloric acid and was then extracted with ether. The extracts were combined and were dried over anhydrous magnesium sulfate. The dried extracts were then evaporated on a steam bath and the resulting residue was recrystallized from pentane to yield the desired product 1-carboxy-3-methylene-1,2,2,4,5-pentachloropent-4-ene having a melting point of 124.5 to 125° C. and having the following elemental analysis as calculated for $C_7H_8Cl_5O_2$:

Theoretical (percent): C, 28.36; H, 1.02; Cl, 59.81.
Found (percent): C, 28.47; H, 1.39; Cl, 60.05.

For practical use as a herbicide, the compound of this invention is generally incorporated into herbicidal compositions which comprise an inert carrier and a herbicidally toxic amount of the compound. Such herbicidal compositions, which can also be called formulations, enable the active compound to be applied conveniently to the site of the weed infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to1.5 mm. Wettable powders, which can be dispersed in water or oil to any desired concentration of the active compound, can be prepared by incorporating wetting agents into concentrated dust compositions.

In some cases the active compound is sufficiently soluble in common organic solvents such as kerosene or xylene so that it can be used directly as a solution in these solvents. Frequently, solutions of herbicides can be dispersed under superatmospheric pressure as aerosols. However, preferred liquid herbicidal compositions are emulsifiable concentrates, which comprise the active compound according to this invention and as the inert carrier, a solvent and an emulsifier. Such emulsifiable concentrates can be extended with water and/or oil to any desired concentration of active compound for application as sprays to the site of the weed infestation. The emulsifiers most commonly used in these concentrates are nonionic or mixtures of nonionic with anionic surface-active agents. With the use of some emulsifier systems an inverted emulsion (water in oil) can be prepared for direct application to weed infestations.

A typical herbicidal composition according to this invention is illustrated by the following example, in which the quantities are in parts by weight.

EXAMPLE 2

Preparation of a dust

Product of Example 1 _____ 10
Powdered talc _____ 90

The above ingredients are mixed in a mechanical grinder-blender and are ground until a homogeneous, free-flowing dust of the desired particle size is obtained. This dust is suitable for direct application to the site of the weed infestation.

The compound of this invention can be applied as a herbicide in any manner recognized by the art. One method for the control of weeds comprises contacting the locus of said weeds with a herbicidal composition comprising an inert carrier and, as an essential active ingredient, in a quantity which is herbicidally toxic to said weeds, the compound of the present invention. The concentration of the new compound of this invention in the herbicidal compositions will vary greatly with the type of formulation and the purpose for which it is designed, but generally the herbicidal compositions will comprise from about 0.05 to about 95 percent by weight of the active compound of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers, spreaders, deactivators, adhesives, stickers, fertilizers, activators, synergists, and the like.

Weeds are undesirable plants growing where they are not wanted, having no economic value, and interfering with the production of cultivated crops, with the growing of ornamental plants, or with the welfare of livestock. Many types of weeds are known, including annuals such as pigweed, lambsquarters, foxtail, crabgrass, wild mustard, field pennycress, ryegrass, goose-grass, chickweed, wild oats, velvet leaf, purselane, barnyard grass, smartweed, knotweed, cocklebur, wild buckwheat, kochia, medic, corn cockle, ragweed, sowthistle, coffee-weed, croton, cuphea, dodder, fumitory, groundsel, hemp nettle, knowel, spurge, spurry, emex, jungle rice, pondweed, dog fennel, carpetweed, morning glory, bedstraw, ducksalad and naiad; biennials such as wild carrot, matricaria, wild barley, campion, chamomile, burdock, mullein, round-leaved mallow, bull thistle, hounds-tongue, moth mullein and purple star thistle; or perennials such as white cockle, perennial rye-grass, quackgrass, Johnson grass, Canada thistle, hedge bindweed, Bermuda grass, sheep sorrel, curly dock, nutgrass, field chickweed, dandelion, campanula, field bindweed, Russian knapweed, mesquite, toadflax, yarrow, aster, gromwell, horsetail, ironweed, sesbania, bulrush, cattail and winter-cress.

Similarly, such weeds can be classified as broadleaf or grassy weeds. It is economically desirable to control the growth of such weeds without damaging beneficial plant or livestock.

The new compound of this invention is particularly valuable for weed control because it is toxic to many species and groups of weeds while it is relatively nontoxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

The herbicidal toxicity of the new compound of this invention can be illustrated by many of the established testing techniques known to the art, such as pre- and post-emergence testing.

The herbicidal activity of the compound of this invention was demonstrated by experiments carried out for the pre-emergence control of crabgrass and foxtail weeds. In these experiments small plastic greenhouse pots filled with dry soil were seeded with crabgrass and foxtail. Twenty-four hours or less after seeding the pots were sprayed with water until the soil was wet and the test compound formulated as an aqueous emulsion of an acetone solution containing emulsifiers was sprayed at the rate of 4 pounds per acre on the surface of the soil.

After spraying, the soil containers were placed in the greenhouse and provided with supplementary heat as required and daily or more frequent watering. The plants were maintained under these conditions for a period of from 15 to 21 days, at which time the condition of the plants and the degree of injury to the plants was rated on a scale of from 1 to 5, as follows: 1=no injury, 2=slight injury, 3=moderate injury, 4=severe injury, and 5=death. In this experiment the compound of the present invention gave injury ratings of 4 against crabgrass and 3 against foxtail.

I claim:
1. 1 - carboxy-3-methylene-1,2,2,4,5-pentachloropent-4-ene.

References Cited
UNITED STATES PATENTS 2,871,255  1/1959  Molotsky et al. _____ 260—468

LORRAINE A. WEINBERGER, Primary Examiner

R. GERSTL, Assistant Examiner

U.S. Cl. X.R.

71—113

PO-1050
(5/69)

UNITED STATES PATENT OFFICE
CERTIFICATE OF CORRECTION

Patent No. 3,584,037  Dated June 8, 1971

Inventor(s) Jerome A. Gourse

It is certified that error appears in the above-identified patent and that said Letters Patent are hereby corrected as shown below:

In column 1 line 34, for "[2.2.-]" read --[2.2.1]--.

Signed and sealed this 29th day of February 1972.

(SEAL)
Attest:

EDWARD M. FLETCHER, JR.
Attesting Officer

ROBERT GOTTSCHALK
Commissioner of Patents